United States Patent
Bessler et al.

(12)

(10) Patent No.: US 6,248,977 B1
(45) Date of Patent: Jun. 19, 2001

(54) WELDING TORCH ATTACHMENT

(75) Inventors: Jeffrey A. Bessler; James D. Cunningham; Gerald M. Ertel, all of Batesville; Tammy J. Allen, Sunman, all of IN (US)

(73) Assignee: Hill-Rom, Inc., Batesville, IN (US)

( * ) Notice: Subject to any disclaimer, the term of this patent is extended or adjusted under 35 U.S.C. 154(b) by 0 days.

(21) Appl. No.: 09/454,439

(22) Filed: Dec. 3, 1999

(51) Int. Cl.[7] .................................................. B23K 9/00
(52) U.S. Cl. ........................ 219/137.43; 219/136
(58) Field of Search ...................... 219/74, 75, 136, 219/747, 137.43

(56) References Cited

U.S. PATENT DOCUMENTS

| | | | |
|---|---|---|---|
| 1,552,369 | * | 9/1925 | White ...................................... 219/74 |
| 1,749,765 | * | 3/1930 | Hendrickson ........................... 219/74 |
| 2,410,306 | * | 10/1946 | Romberg ................................ 219/147 |
| 2,549,804 | * | 4/1951 | Graham ................................. 219/136 |
| 2,928,933 | | 3/1960 | Andriola . |
| 3,536,888 | | 10/1970 | Borneman . |
| 3,739,133 | * | 6/1973 | Kadlez et al. ........................... 219/74 |
| 4,672,163 | | 6/1987 | Matsui et al. . |
| 4,783,584 | * | 11/1988 | Hecker .................................. 219/136 |
| 4,891,489 | | 1/1990 | Bollinger et al. . |
| 5,796,070 | | 8/1998 | Karp . |

OTHER PUBLICATIONS

McMaster–Carr catalog, "Ceramic Sleeve Packing", p. 2797, date unknown.

* cited by examiner

*Primary Examiner*—Clifford C. Shaw
(74) *Attorney, Agent, or Firm*—Bose McKinney & Evans LLP

(57) ABSTRACT

A welding torch flash shield is used with a welding torch to protect the eyes of personnel working near the welding torch. The torch flash shield is comprised of a flexible elongated sleeve having a first open end provided distal from a second open end. The first open end is configured to seat about a periphery of the nozzle end such that the sleeve extends from the nozzle end shrouding a welding wire of the welding torch. A retainer is configured to couple the flexible elongated sleeve to the periphery of the nozzle end. In addition, the second end flexes or flares to permit contact between the welding wire and a workpiece.

20 Claims, 4 Drawing Sheets

WELDING TORCH ATTACHMENT

TECHNICAL FIELD

The present invention relates to an attachment for a welding torch. More particularly, the present invention relates to a welding torch flash shield.

BACKGROUND ART

Metal Inert Gas (MIG) welding, also known as metal or plasma arc welding, is well known in the art. This type of welding employs a continuous feed of welding wire through a welding torch. The tip of the welding wire exposed at the end of the torch serves as the source material that is welded onto a workpiece. In addition, an inert gas, such as argon or helium, is supplied through the welding torch to form an inert atmosphere about the wire tip. The welding torch produces a high temperature discharge which ionizes the gas and causes a plasma arc to form between the tip of the welding wire and a workpiece. This arc causes the welding wire to melt thus supplying molten metal that creates the weld. The plasma arc, however also produces an intense flash of light that can be damaging to eyes that are not adequately protected. Currently, such welding torches are often used by robots for precision welding, not requiring direct human interaction. It is sometimes necessary, however, for personnel to work in the vicinity of these welding torches. These personnel may be close enough so that the flash from the welding arc may still cause damage to their eyes. It would, therefore, be advantageous to provide a shield on welding torches to substantially block the intense flash of light produced during a welding operation.

SUMMARY OF THE INVENTION

According to certain features, characteristics, embodiments and alternatives of the present invention which will become apparent as the description thereof proceeds below, the present invention provides a welding torch flash shield for use with a welding torch. The torch includes a nozzle end with a welding wire extending therefrom. The welding torch flash shield comprises a sleeve having a plurality of flexible strands. The sleeve has a first open end and a second open end. The first open end is configured to receive a peripheral portion of the nozzle end such that the sleeve extends from the nozzle end and shrouds the welding wire. A retainer is configured to couple the flexible elongated sleeve to the periphery of the nozzle end. The second end of the sleeve extends beyond the nozzle end and covers the welding wire.

Another embodiment of the present invention is directed to a welding torch flash shield having a plurality of flexible elongated bristles which form a flexible elongate sleeve having first and second ends. A retainer is configured to position the first end about a periphery of the nozzle end of a welding torch. The second end extends from the nozzle end and is configured to shroud the welding wire.

According to an aspect of the present invention, in combination with such a welding torch, the second open end of the welding torch flash shield extends beyond and flares radially from the welding wire. Alternatively, the elongate sleeve may comprise a plurality of ceramic bristles that are received in a collar which can be coupled to the periphery of the nozzle end. In a further alternative, the elongate sleeve may comprise a plurality of ceramic bristles.

Additional features of the invention will become apparent to those skilled in the art upon consideration of the following detailed description exemplifying the best mode of carrying out the invention as presently perceived.

BRIEF DESCRIPTION OF THE DRAWINGS

The present invention will be described with reference to the attached drawings which are given as non-limiting examples only, in which.

Corresponding reference characters indicate corresponding parts throughout the several views. The exemplification set out herein illustrates several embodiments of the invention and such exemplification is not to be construed as limiting the scope of the invention in any manner.

DETAILED DESCRIPTION OF DRAWINGS

The present invention relates to an attachment for a welding torch. More particularly, the present invention relates to a welding torch flash shield. The flash shield generally comprises a sleeve including a plurality of strands or a plurality of bristles surrounding the end or nozzle of a welding torch. The sleeve or bristles block the flash produced by the charge between the welding wire and the workpiece to be welded. The flash shield of the present invention can be sized and configured to fit a variety of welding torch nozzles.

Figure 1:
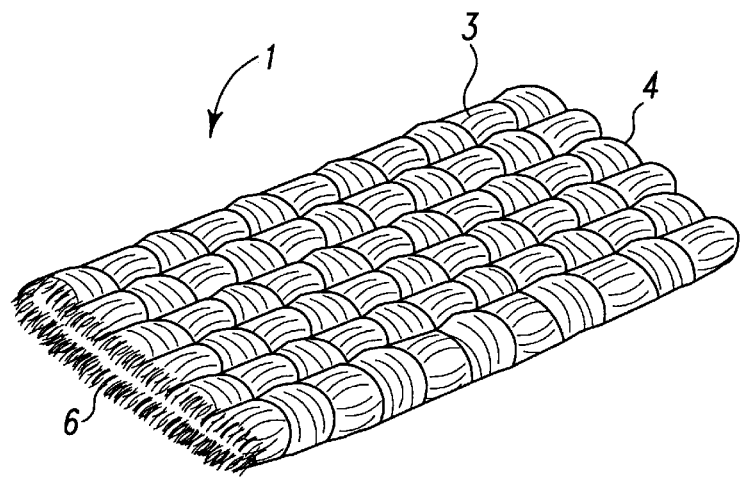
FIG. 1 is a perspective view of a flash shield according to one embodiment of the present invention.
Figure 2:
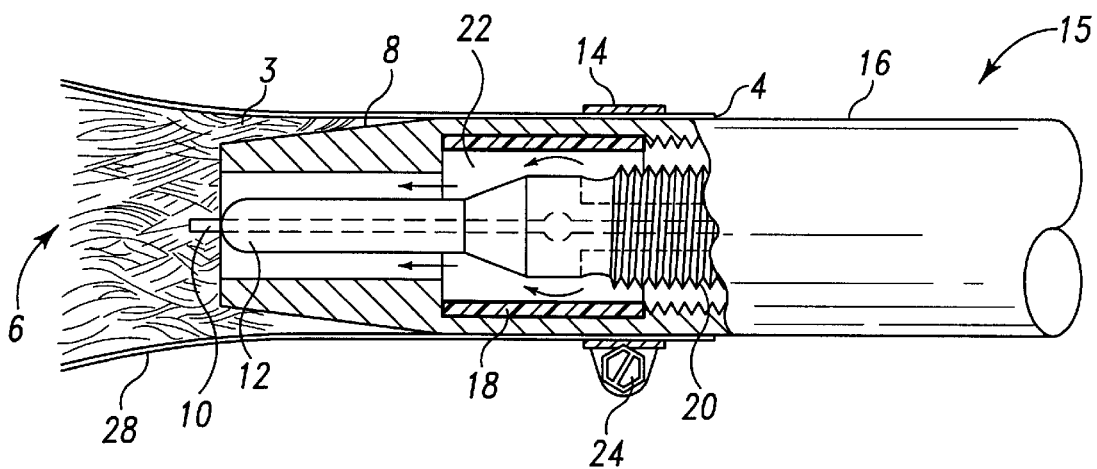
FIG. 2 is a partial sectional view of a welding torch incorporating the flash shield of FIG. 1.

A perspective view of a flash shield 1 according to one embodiment of the present invention is shown in FIG. 1. In the illustrated embodiment, shield 1 comprises a plurality of flexible woven cords or strands 3. Shield 1 includes a first open end 4 and a second open end 6. First open end 4 is configured to receive a peripheral portion of nozzle 8, as shown in FIG. 2. Second open end 6 is configured to be positioned about a welding wire 10 extending from tip member 12 of nozzle 8. Shield 1 is preferably a woven ceramic sleeve that provides insulative and temperature resistance properties while still maintaining flexibility. Illustratively, the ceramic sleeve can be made from a combination of woven alumina, boria, and silica fibers with a high aluminum content. This combination offers high strength and thermal resistance while remaining flexible enough to move as the woven ceramic sleeve contacts the workpiece (not shown). It is appreciated, however, that the woven fibers can be made of any suitable material that offers the combination of temperature resistance, strength and flexibility while having the ability to shield the flash.

A partial sectional view of a welding torch 15 incorporating flash shield 1 is shown in FIG. 2. Welding torch 15 comprises nozzle 8 attached to body 16. Nozzle 8 extends through first open end 4 in an axial orientation with respect to body 16. A continuous supply of welding wire 10 is fed through body 16, so that it extends out from tip member 12. Tip member 12 is connected to nozzle 8 at threaded portion 20 on collar 18 seated within nozzle 8. An annular passageway 22 is provided within body 16 about tip member 12. The annular passageway 22 extends axially with respect to body 16. An inert gas such as argon or helium flows through passageway 22 to provide an inert gaseous environment at the end of wire 10 to prevent the metal from oxidizing under the surface of the weld.

Figure 5:
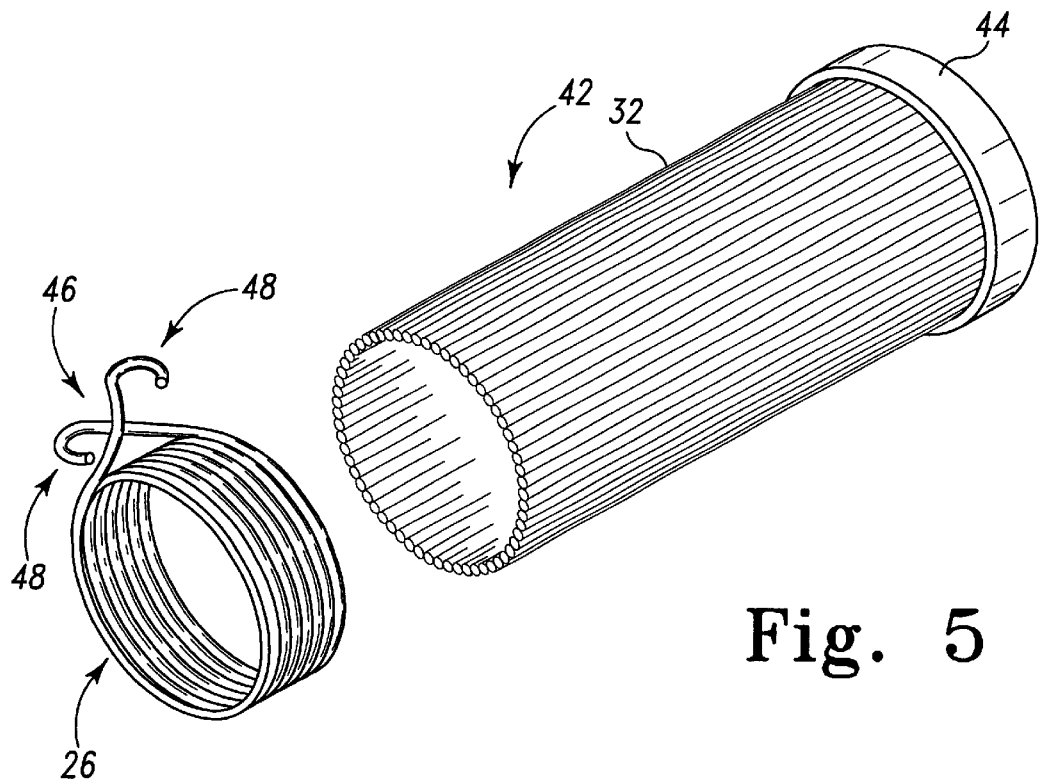
FIG. 5 is a perspective view of a flash shield according to still another embodiment of the present invention.
Figure 6:
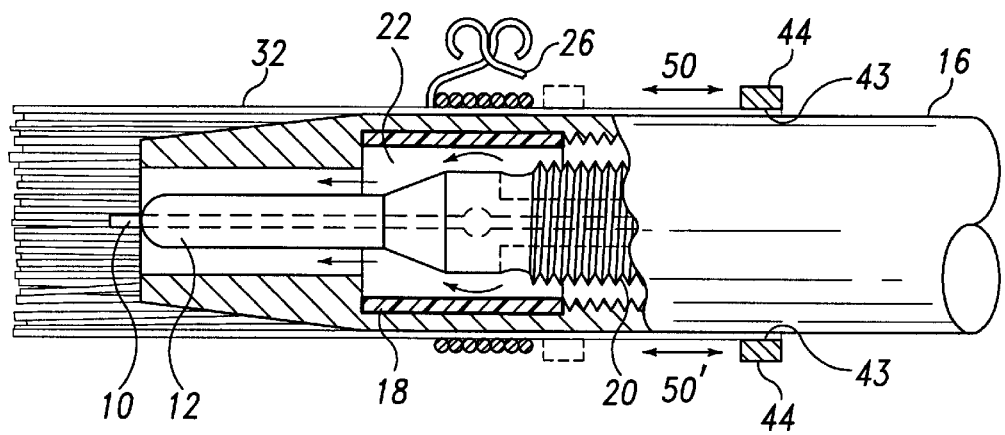
FIG. 6 is a partial sectional view of a welding torch incorporating the flash shield of FIG. 5.

A retainer or clamp 14 is provided about flash shield 1 to removably maintain shield 1 on nozzle 8. Illustratively, clamp 14 is secured against the peripheral surface of nozzle 8 by tightening screw 24. Loosening screw 24 permits shield 1 to be adjustably positioned along nozzle 8 or removed and replaced. It will be appreciated that any variety of retaining means can be employed to couple shield 1 with body 16 or nozzle 8. For example, FIGS. 5 and 6 show an alternative embodiment of the present invention in which a flash shield is removably maintained on body 16 of welding body 16 (or nozzle 8, not shown) by retainer or pinch clamp 26 as subsequently discussed herein.

As also shown in FIG. 2, shield 1 longitudinally extends beyond the end of welding wire 10. In the illustrated embodiment, shield 1 includes a flare 28 formed near second open end 6. Flare 28 occurs as a result of engagement with a workpiece. The flexibility of the strands 3 of shield 1 and the change in axial distance that can occur between the workpiece and nozzle 8 may cause shield 1 to either increase or decrease in axial length affecting the degree or diameter of flare 28. Consequently, as the axial length of shield 1 increases or decreases, the degree or diameter of flare 28 increases or decreases, respectively. This allows nozzle 8 to be shrouded by shield 1 blocking any flash, regardless of whether nozzle 8 moves toward or away from the workpiece. It is appreciated that open end 6 may extend beyond the end of welding wire 10 any sufficient amount to adequately shield the flash.

Figure 3:
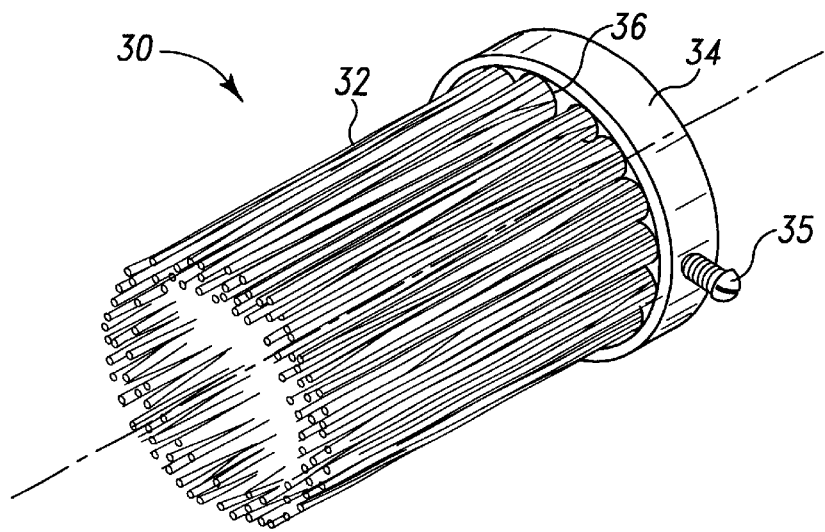
FIG. 3 is a perspective view of a flash shield according to another embodiment of the present invention.

A perspective view of a flash shield 30 according to another embodiment of the present invention is shown in FIG. 3. In this illustrated embodiment, flash shield 30 comprises a plurality of strands or bristles 32 extending axially with respect to nozzle 8 shrouding same (see FIG. 4). Bristles 32 can be made from any suitable material including a ceramic. A collar 34 is provided including several apertures 36 axially disposed therethrough and substantially parallel to body 16. (See also FIG. 4.) Collar 34 is maintained on body 16 by tightening one or more set screws 35 against body 16. Set screw 35 is illustratively configured to radially extend through a bore 37 within collar 34 until it contacts body 16 creating a gripping force with collar 34. Those skilled in the art will appreciate that collar 34 may be coupled to body 16 in other ways.

First end 31 of bristles 36 can be secured within aperture 36 by any suitable method including either a frictional fit or use of adhesive. It is appreciated, however, that bristles 32 can be attached to collar 34 by any suitable means in lieu of apertures 36. It is also appreciated that first end 31 of bristles 32 need not necessarily attach to a collar, but can attach directly onto the periphery of nozzle 8 or body 16. This may be accomplished, for example, by employing an adhesive to attach bristles 32 to body 16, or, body 16 may include a receptacle configured to receive bristles 32.

Figure 4:
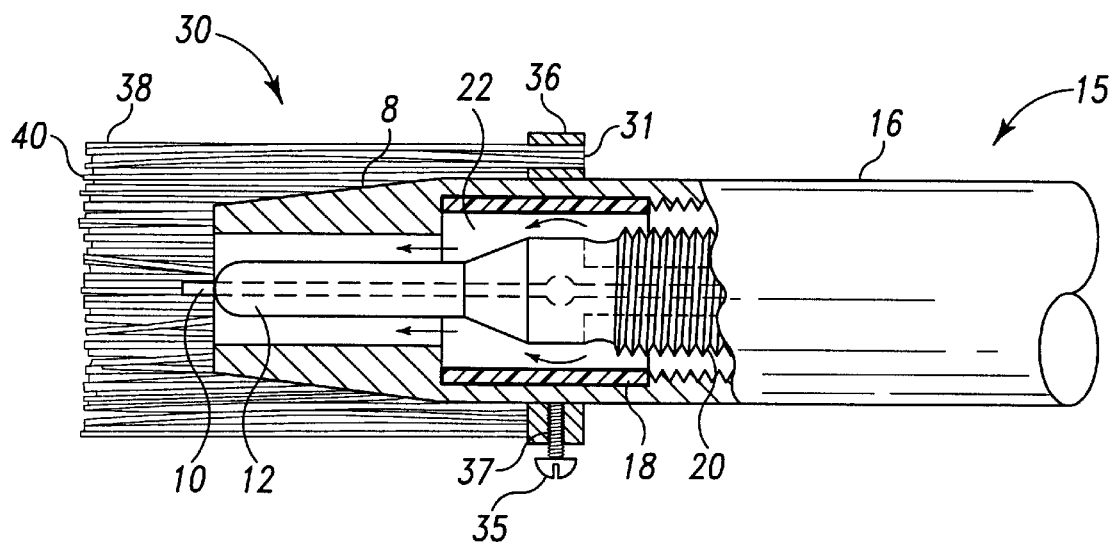
FIG. 4 is a partial sectional view of a welding torch incorporating the flash shield of FIG. 3.

A partial sectional view of welding torch 15 incorporating the flash shield 30 is shown in FIG. 4. Illustratively, bristles 32 longitudinally extend beyond the end of welding wire 10. Similarly to shield 1 in FIG. 2, bristles 32 form a flare 38 near second ends 40 of bristles 32. Flare 38 occurs as a result of flash shield 30 engaging a workpiece. The change in axial distance between a workpiece and nozzle 8 requires bristles 32 to either increase or decrease in axial length relative to the workpiece. Because bristles 32 cannot physically change length, their flexibility creates the flare 38 compensating for this change in distance. This, again, allows nozzle 8 to be shrouded by shield 1 which blocks any flash regardless of whether nozzle 8 moves toward or away from the workpiece. And again, similarly to shield 1, it is appreciated that second ends 40 of bristles 32 may extend beyond the end of welding wire 10 any sufficient amount to adequately shield the flash.

An alternative embodiment of a flash shield 42 is shown in FIGS. 5 and 6. In this illustrated embodiment, flash shield 42 comprises bristles 32 that are attached to the inner periphery 43 of collar 44. Flash shield 42 is secured to body 16 via a retainer or pinch clamp 26. Opposed ends 46 on pinch clamp 26 are moved in a direction indicated by directional arrows 48 and 48' to open pinch clamp 26. When opposed ends 46 are released, pinch clamp 26 constricts to secure bristles 32 to body 16. (See also FIG. 6.) The position of bristles 32 is adjustable by moving collar 44 in an axial direction, illustratively indicated by directional arrows 50 and 50' in FIG. 6. To adjust bristles 32 along an axis parallel to nozzle 8, an operator need only pinch opposed handles 48 and 48' and slide bristles 32 axially to a desired position as indicated by arrows 50 and 50'.

Figure 7:
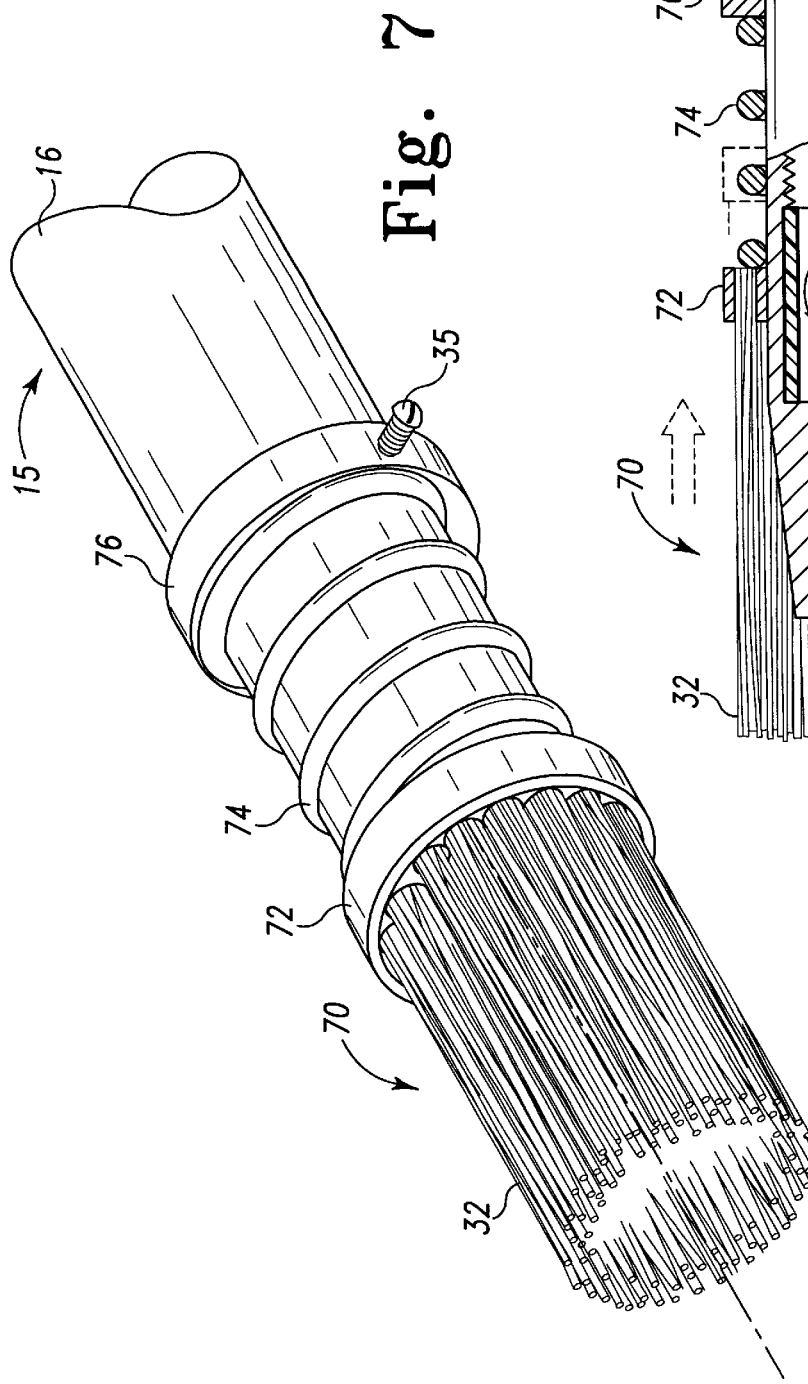
FIG. 7 is a perspective view of a flash shield according to a further embodiment of the present invention.
Figure 8:
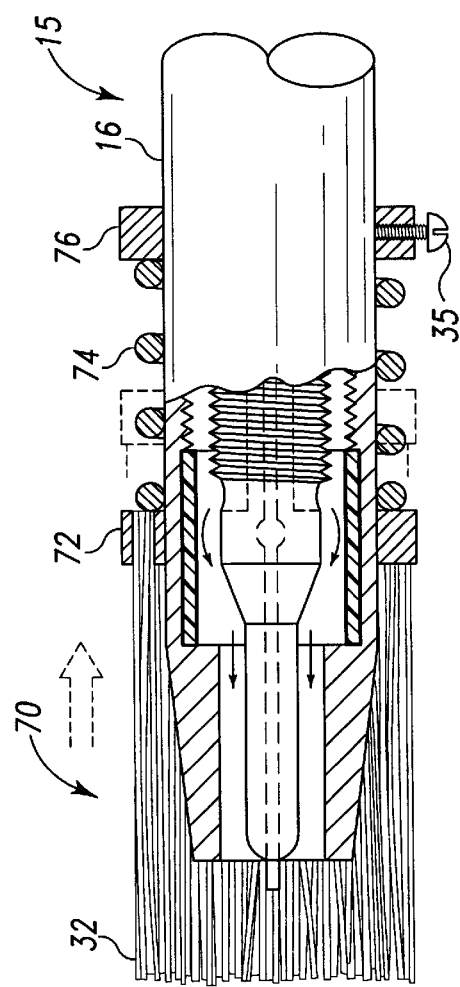
FIG. 8 is a partial sectional view of a welding torch incorporating the flash shield of FIG. 7.

A further embodiment of a flash shield 70 is shown in FIGS. 7 and 8. In this illustrated embodiment, flash shield 70 comprises strands or bristles 32 that are attached to a collar 72, similar to the prior embodiment shown in FIGS. 3 and 4. A spring 74, illustratively provided about body 16, causes a bias on bristles 32 against a workpiece. Any suitable biaser may be used in lieu of spring 74. Collar 72 is movable along body 16 such that bristles 32 remain biased against a workpiece while torch 15 moves closer to or farther away from the workpiece. It is appreciated that collar 72 may be coupled to spring 74 to limit the movement of bristles 32 to a predefined range. Alternatively, a stop (not shown) may be configured to engage shield 70 to limit the movement of same. In addition, it is appreciated that any means that biases shield 72 against the workpiece can be used. Illustratively, a securing collar 76 is coupled to body 16 and spring 74 is coupled to each of collars 76, 72. Securing collar 76 includes a set screw 35 illustratively configured to radially extend from collar 76 into contact with body 16 creating a gripping force against same. Thus, collar 76 is fixed relative to body 16 whereas collar 72 and the bristles 32 attached thereto float relative to body 16. In addition, collar 76 cooperates with spring 74 and collar 72 to serve as a retainer for bristles 32. It is appreciated that collar 76 can be moved toward or away from collar 72 to affect the amount of bias applied to same.

Although the invention has been described in detail with reference to certain preferred embodiments, variations and modifications exist within the scope and spirit of the present invention as described and defined in the following claims.

What is claimed is:

1. A welding torch flash shield for use with a welding torch having a nozzle with a welding wire extending therefrom, the welding torch flash shield comprising;

a flexible elongated sleeve having a plurality of strands, the sleeve having a first open end and a second open end;

said first open end configured to be positioned about a peripheral portion of the nozzle such that the sleeve extends from an end of the nozzle and shrouds the welding wire; and a retainer configured to couple the flexible elongated sleeve to the peripheral portion of the nozzle so that the flexible elongated sleeve has an unrestrained portion positioned between the end of the nozzle and the retainer.

2. The welding torch flash shield of claim 1, wherein the second open end extends beyond the welding wire.

3. The welding torch flash shield of claim 2, wherein the second open end flares radially from the welding wire when engaging a workpiece.

4. The welding torch flash shield of claim 1, wherein the plurality of strands comprises a plurality of ceramic bristles.

5. The welding torch flash shied of claim 4, wherein the retainer comprises a collar coupled to the peripheral portion of the nozzle end.

6. The welding torch flash of claim 1, wherein the flexible elongated sleeve comprises a plurality of ceramic cords extending from the first to second open ends.

7. The welding torch flash shield of claim 6, wherein the plurality of ceramic cords is braided.

8. A welding torch flash shield for use with a welding torch having a nozzle end with a welding wire extending therefrom, the welding torch flash shield comprising:

a plurality of flexible elongated bristles having first and second ends;

a retainer configured to position the first ends of said bristles about a peripheral portion of the nozzle end; and said second ends extending from said nozzle end and the plurality of flexible elongated bristles cooperating to define a flexible sleeve configured to shroud the welding wire, the sleeve having an inner diameter, the elongated bristles having a length greater than the inner diameter of the flexible sleeve.

9. The welding torch flash shield of claim 8, wherein said second ends of the elongate bristles are configured to flare radially from the welding wire when they engage a workpiece.

10. A welding torch flash shield for use with a welding torch having a nozzle end with a welding wire extending therefrom, the welding torch flash shield comprising:

a plurality of strands provided about a peripheral portion of the nozzle end and movable longitudinally relative to the nozzle end; and a biaser positioned adjacent the strands and providing a force against the strands, the biaser being configured to permit longitudinal movement of the strands relative to the nozzle end.

11. The welding torch flash shield of claim 10, wherein the biaser is a spring.

12. The welding torch flash shield of claim 10, further comprising a collar attached to the welding torch adjacent the biaser.

13. A welding torch flash shield for use with a welding torch having a nozzle with a welding wire extending therefrom, the welding torch flash shield comprising:

a flexible sleeve having a plurality of strands, an inner diameter, a first open end, and a second open end spaced apart from the first open end, the first open end being adapted to be positioned about the nozzle such that the sleeve extends from an end of the nozzle and shrouds the welding wire and a retainer configured to couple the flexible elongated sleeve to the peripheral portion of the nozzle end, the flexible sleeve having a restrained portion coupled to the nozzle and an unrestrained portion coupled to the restrained portion, the unrestrained portion of the sleeve being free so flex during movement of the nozzle and having a length greater than the inner diameter of the sleeve.

14. The welding torch flash shield of claim 13, wherein the retainer is adapted to directly couple the flexible sleeve to the nozzle.

15. The welding torch flash shield of claim 14, wherein the flexible sleeve includes a plurality of cords each including a plurality of strands, the plurality of cords are braided together to define the flexible sleeve.

16. The welding torch flash shield of claim 14, wherein the flexible sleeve includes a plurality of strands and the retainer includes a plurality of apertures, each of the plurality of apertures is sized to receive a plurality of the strands.

17. A welding torch configured to weld at least two pieces of material together at a weld location, the welding torch comprising a body having an outer surface and an inner surface defining a passage through which welding wire is provided to the weld location;

a nozzle having an outer surface and an inner surface that cooperates with the outer surface of the body to define a passage through which inert gas is provided to the weld location;

a flexible sleeve having a plurality of strands, a first open end, a second open end spaced apart from the first open end, an inner diameter, and a length greater than the inner diameter, the first open end being adapted to be positioned about the outer surface of the nozzle such that the sleeve extends from an end of the nozzle and shrouds the welding wire; and a retainer configured to couple the flexible sleeve to the nozzle.

18. The welding torch of claim 17, wherein the flexible sleeve is directly coupled to the nozzle.

19. The welding torch of claim 17, wherein the unrestrained portion of the flexible sleeve has a proximal end positioned adjacent to the restrained portion of the flexible sleeve and a distal end spaced apart from the proximal end, the proximal end has a first diameter and the distal end has a second diameter that is greater than the first diameter.

20. The welding torch of claim 17, wherein the flexible sleeve includes a plurality of strands having a length greater than the inner diameter of the inner sleeve.

* * * * *